| United States Patent [19] | [11] 4,006,101 |
|---|---|
| Matsuura et al. | [45] Feb. 1, 1977 |

[54] POLYMERIZATION OF OLEFINS AND CATALYSTS THEREFOR

[75] Inventors: Kazuo Matsuura, Kawasaki; Nobuyuki Kuroda, Yokohama; Takeichi Shiraishi, Kawasaki; Mitsuji Miyoshi, Kanagawa, all of Japan

[73] Assignee: Nippon Oil Company Ltd., Japan

[22] Filed: Aug. 29, 1975

[21] Appl. No.: 608,898

Related U.S. Application Data

[63] Continuation-in-part of Ser. No. 439,959, Feb. 5, 1974, abandoned.

[30] Foreign Application Priority Data

Feb. 9, 1973    Japan .............................. 48-16157

[52] U.S. Cl. ...................... 252/429 C; 252/429 R; 260/88.2; 260/949; 526/89
[51] Int. Cl.² ...................... C08F 4/02; C08F 4/64; C08F 4/68
[58] Field of Search ................... 252/429 R, 429 C

[56] References Cited

UNITED STATES PATENTS

| 3,244,768 | 4/1966 | Holt ........................... 252/429 C X |
|---|---|---|
| 3,400,110 | 9/1968 | Dassesse et al. ............ 252/429 C X |
| 3,642,746 | 2/1972 | Kashiwa et al. ............. 252/429 C X |
| 3,644,318 | 2/1972 | Diedrich et al. ............ 252/429 C X |
| 3,705,886 | 12/1972 | Kashiwa et al. ............ 252/429 C X |
| 3,803,105 | 4/1974 | Galli et al. .................. 252/429 C X |

*Primary Examiner*—Patrick P. Garvin
*Attorney, Agent, or Firm*—Hill, Gross, Simpson, Van Santen, Steadman, Chiara & Simpson

[57] ABSTRACT

A process for the production of polyolefins is disclosed, which is carried out in the presence of catalysts prepared according to the invention. The catalysts comprise a carrier resulting from the reaction of anhydrous magnesium halide, silicon tetrachloride and an alcohol represented by the general formula

ROH where R is an organic group of 1 to 20 carbon atoms, and a titanium and/or a vanadium compound supported on said carrier. Such catalysts are activated by an organoaluminum and/or an organozinc compound when in use.

3 Claims, No Drawings

POLYMERIZATION OF OLEFINS AND CATALYSTS THEREFOR

REFERENCE TO RELATED APPLICATION

This application is a continuation-in-part of our co-pending Ser. No. 439,959 filed Feb. 5, 1974, and now abandoned.

BACKGROUND OF THE INVENTION

1. Field of the Invention

This invention relates to the production of polyolefins and has particular reference to catalysts used therefor.

2. Description of the Prior Art

Heretofore, catalysts for the production of polyolefins were known which comprised transition metals such as titanium and vanadium carried on magnesium halide as disclosed, for example, in Japanese Patent Publication No. 39-12105. Another catalyst known in the art is described in Belgian Pat. No. 742,112 as comprising titanium tetrachloride carried on an anhydrous magnesium halide which has been activated by a ball mill. However, neither of the above prior art catalysts is satisfactory for the production of polyolefins in which a maximum of catalytic activity is required.

Accordingly, it is an object of the invention to provide a process for the polymerization or copolymerization of olefins with the use of a novel catalyst which exhibits a maximum of catalytic activity to permit use of reduced monomer partial pressure and of reduced reaction time, with a minimum of catalyst residues in the resulting polymer, whereby the process can be carried out most economically without involving added steps for removal of residual catalysts.

It has now been found that the process of the invention, wherein catalyst residues in the product polymer are held to an absolute minimum will also provide marked improvements in respect of "fish-eye", "tear", "transparency", etc., of the end products.

SUMMARY OF THE INVENTION

In accordance with the invention, there is provided a solid carrier which results from the reaction of anhydrous magnesium halide, silicon tetrachloride and a compound having the general formula:

ROH where R is an organic group of 1 to 20 carbon atoms. This reaction is carried out at temperatures ranging between 10° and 300° C, preferably between 30° and 220° C, and normally in the absence of solvents, but may be in the presence of inert hydrocarbons or ether compounds. The anhydrous magnesium halide is heated and dissolved in the alcohol (ROH), followed by the addition of silicon tetrachloride. The reaction product is separated as the reaction progresses, with unreacted alcohol and silicon tetrachloride being removed, usually by heating at reduced pressure. If the alcohol is difficult to remove due to its high boiling point, there may be used some inert solvent to wash it away. In the practice of the invention, the silicon tetrachloride may be used in amounts ranging between 1/10 and 100 mols per mol alcohol (ROH), preferably about ¼ or more times greater in mol concentration than the alcohol that has been added to dissolved anhydrous halide.

Upon the carrier thus prepared is supported a titanium compound and/or a vanadium compound, the whole being activated by an organometal compound. The resulting catalyst has now been found peculiarly effective in the polymerization or copolymerization of olefins.

There are known certain catalysts comprising an admixture of anhydrous magnesium halide and such inorganic solid compounds that do not react therewith as, for example, silicon dioxide, aluminum oxide and sodium chloride, upon which admixture a titanium compound is carried, as disclosed in Belgian Pat. No. 770,174 and German Pat. No. 2,137,872. Such prior art catalysts, however, are based on the concept of utilizing inorganic solid compounds as an expedient for supporting the weight of the magnesium halide, since the former do not substantially react with the latter and in view of the fact that the catalytic activity of such catalysts is no greater or somewhat lower than in cases where such inorganic solid compounds are not added.

The catalysts of the invention are characteristically different from the above cited prior art teachings in that much higher catalytic activity, i.e., increased yield of polymer, is achieved as compared to magnesium halides alone. While the structural details of a carrier comprising (a) anhydrous magnesium halide, (b) silicon tetrachloride and (c) an alcohol (ROH) according to the invention are not completely known, it is believed that these three components react with one another and form a novel effective carrier.

DESCRIPTION OF THE PREFERRED EMBODIMENTS

The mol ratio of magnesium halide to silicon tetrachloride may be considerably broad, but the magnesium to silicon mol ratio should preferably be 0.01 to 100, more preferably 0.05 to 50.

The term anhydrous magnesium halide as used in the practice of the invention includes anhydrous magnesium fluoride, anhydrous magnesium chloride, anhydrous magnesium bromide, anhydrous magnesium iodide and mixtures thereof. They may be any of those currently available on the market which may be in polar solvents such as an alcohol, acetone and ether, may be suspended in any of these solvents, or may be obtained from Grignard's compounds in the well known manner. The particle size of the magnesium halide is not critical but is preferably below 200 microns.

The alcohol or compound represented by the general formula ROH as above contains an organic group having from 1 to 20 carbon atoms. Such organic group (R) is preferably a hydrocarbon group such as alkyl, alkenyl, aryl and aralkyl but may contain hetero elements such as oxygen, nitrogen, sulfur, chlorine and the like provided that they do not adversely act upon the other components of the catalyst of the invention. By this is meant that the alcohol or other hydroxy compound does not substantially react with the other components of the composition, i.e., it is inert with respect to the titanium or vanadium catalysts. Typical examples of such alcohols include methanol, ethanol, isopropanol, butanol, pentanol, hexanol, octanol, phenol, chlorophenol, benzyl alcohol, methyl Cellosolve (ethylene glycol monomethyl ether), ethanol amine and mixtures thereof. The manner of carrying titanium and/or vanadium on the reaction product (carrier) of the magnesium halide, alcohol (ROH) and silicon tetrachloride is not restricted. This may be done by contacting the carrier with a transition metal compound under heated conditions either in the presence or absence of inert solvents, but preferably in the absence of such solvents, at temperatures ranging between 50° and 300° C, preferably 100° and 150° C. The reaction time is not particularly critical and may be usually five minutes or longer, say up to ten hours. The reaction must, needless to mention, be carried out in an inert gas atmosphere free of oxygen and moisture. The transition metal halides may be used in amounts of 0.1 to 50 times greater by weight than the carrier. Excess metal halides after treatment should be cleaned and removed preferably with solvents. Unreacted transition metal compounds may be removed for instance with use of solvents inert to Ziegler catalysts, which solvents may be evaporated at reduced pressure so as to obtain solid particles in the usual manner.

The polymerization of olefins according to the invention is carried out in very much the same way as it is done in the presence of Ziegler catalysts where the reaction takes place in an atmosphere substantially free of oxygen and water. It is carried out at a temperature of 20° to 200° C, preferably 50° to 180° C and at a pressure of atmospheric to 70 kg/cm², preferably 2 to 60 kg/cm². Molecular weights of the resulting polymer may be regulated to some extent by varying the polymerization temperature as well as the quantities of catalysts but can be more effectively regulated by the addition of hydrogen in the polymerization admixture.

The process of the invention may be applied to all olefins polymerizable with use of Ziegler catalysts and more specifically to the polymerization of alpha-olefins such as ethylene, propylene and butene-1 and to the copolymerization of ethylene and propylene, ethylene and 1-butene, and propylene and 1-butene, with satisfactory results.

The term transition metal compounds includes titanium and vanadium halides which assume a liquid phase under treatment conditions according to the invention. Typical examples are titanium halides such as titanium tetrachloride, titanium tetrabromide, ethoxy trichlorotitanium, diethoxy dichlorotitanium, dibutoxy dichlorotitanium and phenoxy trichlorotitanium, vanadium halides such as vanadium tetrachloride and oxytrichlorovanadium.

The organometal compounds employed in accordance with the invention may be those classed in the Groups I to IV of the Periodic Table which are known as Ziegler catalyst components, and of which organoaluminum and organozinc compounds are preferred.

The organoaluminum compounds may be represented by the general formulae:

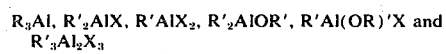

where R is alkyl or aryl group and X is halogen atom; typical examples of which organoaluminum compounds are triethylaluminum, triisobutylaluminum, diethylaluminum chloride and ethylaluminum sesquichloride.

The organozinc compounds may be represented by the general formula:

where R'' is alkyl group; one example of such organozinc compound is diethyl zinc.

These organometal compounds are used in amounts of 0.1 to 100 mol times the concentration of the transition metal halides in the practice of the invention.

The following examples are provided for a better understanding of the invention but are not intended to impose limitations on the invention.

INVENTIVE EXAMPLE I

Preparation of the catalyst

To a nitrogen-purged, 300 milliliter three-necked flask equipped with stirrer and cooler was charged 10 grams anhydrous magnesium chloride, which was vacuum-dried at 150° C for 3 hours. 33.6 grams ethanol were added with stirring at 100° C so as to dissolve the magnesium chloride, followed by charging droplets of 35.5 grams silicon tetrachloride over 10 minutes. The reaction was continued for 1 hour, and the admixture was dried at 250° C at reduced pressure until there was obtained a white particulate reaction product. This product was reacted with 50 milliliters titanium tetrachloride at 130° C for 1 hour, whereafter the same was washed with hexane repeatedly until titanium tetrachloride was no longer found in the wash liquid. The resulting solid compound was dried and analyzed to produce 15.5 milligrams of titanium carried on 1 gram solid.

Polymerization

To a nitrogen-purged, 2liter stainless autoclave equipped with a stirrer were charged 1,000 milliliters hexane, 5 millimols triethyl aluminum and 121 milligrams solid of the above catalyst. The whole was stirred and heated to a temperature of 90° C. The admixture having a pressure of 2 kg/cm² on account of hexane vapor pressure, was charged with hydrogen to a total pressure of 6 kg/cm² and then with ethylene to a total pressure of 10 kg/cm². The polymerization reaction was continued for 15 minutes with continued introduction of ethylene to maintain a total pressure of 10 kg/cm². Upon completion of the reaction, the resulting polymeric slurry was taken into a beaker with hexane removed at reduced pressure. There was obtained 135 grams white polyethylene having a melt index of 12.8. Polymerization activity was represented by 71,600 grams polyethylene per gram titanium per hour per ethylene pressure, or 1,110 grams polyethylene per gram solid per hour per ethylene pressure.

COMPARATIVE EXAMPLE I

The procedure of Inventive Example I was followed with the exception that silicon tetrachloride was not used. There was obtained a solid compound with 8.1 milligrams titanium carried per gram thereof. 169.7 milligrams of this solid were used in the polymerization of ethylene which took place for 30 minutes substantially in the same manner as described in Inventive Example I. There was obtained 95.3 grams white polyethylene having a melt index of 7.1. Polymerization activity was represented by 282 grams polyethylene per gram solid per hour per ethylene pressure, or 38,400 grams polyethylene per gram titanium per hour ethylene pressure.

INVENTIVE EXAMPLE II

The procedure of Inventive Example I was followed in preparing the catalyst with the exception that 177.5 grams silicon tetrachloride was used, whereby there was obtained a solid catalyst consisting of 11.2 milligrams titanium carried per gram solid. Polymerization of ethylene was effected with use of 126 milligrams of this solid catalyst for 15 minutes. There was obtained 119 grams white polyethylene having a melt index of 5.3. Polymerization activity was represented by 84,500 grams polyethylene per gram titanium per hour per ethylene pressure, or 940 grams polyethylene per gram solid per hour per ethylene pressure.

INVENTIVE EXAMPLE III

The procedure of Inventive Example I was followed in preparing the catalyst with the exception that 48 grams ethanol and 18 grams silicon tetrachloride were used, whereby there was obtained a solid catalyst consisting of 19.3 milligrams titanium carried per gram solid. Polymerization of ethylene was effected with use of 107 milligrams of this solid catalyst for 15 minutes. There was obtained 116 grams white polyethylene having a melt index of 8.1. Polymerization activity was represented by 56,300 grams polyethylene per gram titanium per hour per ethylene pressure, or 1,085 grams polyethylene per gram solid per hour per ethylene pressure.

INVENTIVE EXAMPLE IV

Ten grams anhydrous magnesium chloride were charged and vacuum-dried at 150° C for 3 hours. It was admixed with 68.8 grams phenol dissolved in 100 grams of ethyl ether and stirred at 100° C for 30 minutes, followed by charging droplets of 35.5 grams silicon tetrachloride over 10 minutes. The reaction was continued for 3 hours, and thereafter unreacted phenol was removed by washing with ether. The reaction product was dried at 250° C at reduced pressure, whereupon there was obtained a white particulate compound. The procedure of Inventive Example I was followed in subsequently producing a solid catalyst having 11.8 milligrams titanium carried per gram thereof. Polymerization was substantially the same as carried out in Inventive Example I, except that 136 milligrams of the solid catalyst were used. There was obtained 155 grams polyethylene having a melt index of 6.3. Polymerization activity was represented by 96,000 grams polyethylene per gram titanium per hour ethylene pressure, or 1,140 grams polyethylene per gram solid per hour per ethylene pressure.

INVENTIVE EXAMPLE V

The procedure of Inventive Example I was followed in preparing the catalyst with the exception that 55.7 grams methyl "Cellosolve" were used in place of ethanol, whereby there was obtained a solid catalyst consisting of 16.5 milligrams titanium carried per gram solid. Polymerization of ethylene was effected with use of 119 milligrams of this solid catalyst in the same manner as in Inventive Example I. There was obtained 81.5 grams polyethylene having a melt index of 5.6. Polymerization activity was represented by 41,500 grams polyethylene per gram titanium per hour per ethylene pressure, or 685 grams polyethylene per gram solid per hour per ethylene pressure.

INVENTIVE EXAMPLE VI

The procedure of Inventive Example I was followed in preparing the catalyst with the exception that a mixture of 33.6 grams ethanol and 17.2 grams phenol were used and that the admixture after being reacted was washed with ether and then dried at 250° C at reduced pressure, whereby there was obtained a solid catalyst consisting of 14.9 milligrams titanium carried per gram solid. Polymerization of ethylene was effected with use of 127 milligrams of this catalyst for 15 minutes in the same manner as in Inventive Example I. There was obtained 188 grams polyethylene having a melt index of 4.1. Polymerization activity was represented by 99,500 grams polyethylene per gram titanium per hour per ethylene pressure, or 1,480 grams polyethylene per gram solid per hour per ethylene pressure.

INVENTIVE EXAMPLE VII

One hundred and thirteen milligrams of the catalyst prepared according to Inventive Example I were used in the polymerization of ethylene, where 5 millimols diethylzinc were added in place of triethyl aluminum. Polymerization was continued for 15 minutes in the same manner as in Inventive Example I, whereupon there was obtained 85.5 grams polyethylene having a melt index of 13.5. Polymerization activity was represented by 48,900 grams polyethylene per gram titanium per hour per ethylene pressure, or 756 grams polyethylene per gram solid per hour per ethylene pressure.

INVENTIVE EXAMPLE VIII

The procedure of Inventive Example I was followed in preparing the catalyst with the exception that vanadium tetrachloride was used in place of titanium tetrachloride, thereby there was obtained a solid catalyst consisting of 12.8 milligrams vanadium carrier per gram solid. Polymerization of ethylene was carried out also in the manner disclosed in Inventive Example I, except that 145 milligrams of this catalyst were used. There were obtained 97 grams polyethylene having a melt index of 3.1. Polymerization activity was represented by 52,300 grams polyethylene per gram vanadium per hour per ethylene pressure, or 670 grams polyethylene per gram solid per hour per ethylene pressure.

INVENTIVE EXAMPLE IX

One hundred and thirteen milligrams catalyst of Inventive Example I, 5 millimols triethyl aluminum and 1,000 milliliters hexane were charged into an autoclave. Hydrogen was also charged to 1.5 kg/cm$^2$, followed by charging an ethylene-propylene gas (containing 2 mol percent propylene) pressure maintained at 7 kg/cm$^2$. There was obtained 111 grams ethylene-propylene copolymer having 5.6 methyl groups per 1,000 carbon atoms and a melt index of 9.5. Polymerization activity was represented by 49,100 grams polyethylene per gram titanium per hour per ethylene pressure, or 762 grams polyethylene per gram solid per hour per ethylene pressure.

Although minor modifications might be suggested by those versed in the art, it should be understood that we wish to embody within the scope of the patent warranted hereon all such modifications as reasonably and properly come within the scope of our contribution to the art.

We claim as our invention:

1. A catalyst composition for use in the polymerization or copolymerization of olefins which consists essentially of a solid carrier and a titanium halide, a vanadium halide mixtures thereof carried thereon, said halides being liquid at the treatment conditions, said titanium halide being titanium tetrachloride, titanium tetrabromide, ethoxy trichlorotitanium, diethoxy dichlorotitanium, dibutoxy dichlorotitanium or phenoxy trichlorotitanium and said vanadium halide being vanadium tetrachloride or oxytrichlorovanadium, said solid carrier resulting from the reaction of
   a. anhydrous magnesium halide
   b. silicon tetrachloride, and
   c. a compound having the general formula

ROH where R is an organic group of 1 to 20 carbon atoms, said organic group being an alkyl, alkenyl, aryl or aralkyl group or substituted alkyl, alkenyl, aryl or aralkyl group, in which the substituents do not substantially react with the other components of the composition, the mol ratio of the compound ROH to silicon tetrachloride being in the range from 1 to 1/10 to 100, and the mol ratio of said anhydrous magnesium halide to said silicon tetrachloride being 1 to 0.01 to 100, the reaction being carried out at a temperature of from 10° to 300° C.

2. The catalyst composition as defined in claim 1 wherein said compound ROH is selected from the group consisting of methanol, ethanol, isopropanol, butanol, pentanol, hexanol, octanol, phenol, chlorophenol, benzylalcohol, ethylene glycol monomethyl ether, and ethanol amine.

3. A process for the preparation of a catalyst for use in the polymerization or copolymerization of olefins which consists essentially of admixing
   a. anhydrous magnesium halide,
   b. silicon tetrachloride and
   c. a compound having the general formula

ROH where R is an alkyl, alkenyl, aryl, or aralkyl group or substituted alkyl, alkenyl, aryl, or aralkyl group of 1 to 20 carbon atoms, said compound being substantially unreactive with the other components of the composition, the mol ratio of the compound ROH to silicon tetrachloride being in the range from 1 to 1/10 to 100, and the mol ratio of said anhydrous magnesium halide to said silicon tetrachloride being 1 to 0.01 to 100, and heating the admixture at temperatures ranging between 10° and 300° C, adding a titanium halide, a vanadium halide or mixtures thereof in amounts 0.1 – 50 times greater in weight than said admixture, said halides being liquid at the treatment conditions, said titanium halide being titanium tetrachloride, titanium tetrabromide, ethoxy trichlorotitanium, diethoxy dichlorotitanium, dibutoxy dichlorotitanium or phenoxy trichlorotitanium and said vanadium halide being vanadium tetrachloride or oxytrichlorovanadium, heating the whole at 50° –300° C, and contacting the same with an organoaluminium compound, an organozinc compound, or mixtures thereof, said organoaluminum compound having the formula $R'_3Al$, $R'_2AlX$, $R'AlX_2$, $R_2'AlOR'$, $R'Al(OR')X$, or $R'_3Al_2X_3$, where R is an alkyl or aryl group and X is a halogen atom, and said organozinc compound has the formula $R''_2Zn$ where R'' is an alkyl group.

* * * * *